United States Patent Office 3,591,631
Patented July 6, 1971

3,591,631
NOVEL PROCESS FOR THE PREPARATION OF UREA-N,N'-DICARBOXYLIC ACIDS
Jörg Strickrodt, Hannover, and Gerhard Blume and Hans Scheck, Wolfenbuttel, Germany, assignors to Salzgitter Chemie GmbH, Hannover, Germany
No Drawing. Filed Apr. 10, 1968, Ser. No. 720,361
Claims priority, application Germany, Apr. 11, 1967, S 109,278
Int. Cl. C07c 99/06, 127/16
U.S. Cl. 260—534          5 Claims

ABSTRACT OF THE DISCLOSURE

A process for the preparation of urea-N,N'-dicarboxylic acids from (1) amino-carboxylic acids, their salts or the corresponding lactams and (2) carbonyl sulfide.

---

This invention relates to a novel process for the preparation of urea-N,N'-dicarboxylic acids from amino-carboxylic acids, their salts or the corresponding lactams and carbonyl sulfide.

More particularly, the present invention relates to a novel process for the preparation of urea-N,N'-di-lower alkanoic acids and especially urea-N,N'-dicaproic acid.

Urea-N,N'-dicarboxylic acids are known compounds and are useful in that improved condensation polymers of the nylon-6,6 type can be prepared therefrom with diamines. For instance, the urea-polyamide obtained from urea-N,N'-dicaproic acid and hexamethylenediamine is alleged to have a higher melting point and greater strength and hardness than nylon-6.

It is further known that urea-N,N'-dicarboxylic acids can be obtained by reacting an ester or salt of an amino-carboxylic acid with phosgene or diphenylcarbonate and subsequently hydrolyzing the reaction product. Moreover, a urea-N,N'-dicarboxylic acid may also be obtained by oxidizing the corresponding thiourea compound. Finally, it is known that a urea-N,N'-dicarboxylic acid is formed by reacting an amino-carboxylic acid with urea in the presence of water or a water-containing solvent under pressure and at temperatures from 100 to 150° C.

We have discovered that a urea-N,N'-dicarboxylic acid, and particularly a urea-N,N-di-lower alkanoic acid, such as urea-N,N'-dicaproic acid, can be prepared in much simpler fashion by reacting an amino-carboxylic acid or a lactam thereof in the presence of a preferably equimolar amount of an alkaline-reacting compound, or a salt of said amino-carboxylic acid, especially an alkali metal salt, either in the molten state or dissolved or dispersed in a solvent, with carbonyl sulfide (COS) at a temperature of 60 to 200° C., preferably 90 to 130° C., and at atmospheric pressure or a pressure deviating very little therefrom, accompanied by evolution of hydrogen sulfide.

Our novel process may be used to prepare any urea-N,N'-dicarboxylic acid of the formula

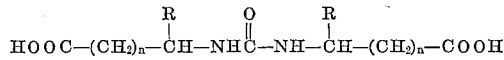

wherein R is hydrogen or any desired organic radical, and $n$ is 0, 1 or an integer larger than 1, depending upon the amino-carboxylic acid or lactam used as the starting material.

For the preparation of a urea-N,N'-dicarboxylic acid of the above formula in accordance with the present invention, it is preferred for reasons of economy to start with a lactam if the particular lactam, such as caprolactam, is readily accessible.

Suitable solvents for the amino-carboxylic acid or lactam starting compound include all of the well known solvents which are inert under the reaction conditions, such as water, alcohols, aliphatic or aromatic hydrocarbons, halogenated hydrocarbons, ketones or the like. Most advantageously, a solvent is used which has a boiling point in the neighborhood of 90–130° C. and whose capacity for dissolving the desired end product increases significantly between room temperature and its boiling point. Particularly preferred as an inert solvent medium is water or a water-miscible organic solvent, such as an alcohol, However, the molten starting material or end product may also serve as the solvent medium.

The reactants may be provided in any desired weight ratio, but since the reaction proceeds practically stoichiometrically and very rapidly between 90 and 130° C. under the conditions set forth above, it is advantageous to provide a slight excess of carbonyl sulfide over and above the stoichiometrically required amount.

The carbonyl sulfide may be introduced into the reaction vessels as such or diluted with one or more inert gases, such as nitrogen, carbondioxide, carbonmonoxide, hydrogen, methane or the like, or also in solution in a solvent, such as toluene or glycol. The dilution of the carbonyl sulfide with an inert gas is of advantage because the displacement of the hydrogen sulfide generated by the reaction from the reaction vessel is thereby enhanced.

The reaction according to the present invention is preferably performed by introducing the carbonyl sulfide into a boiling solution of a lactam at atmospheric pressure in the presence of preferably stoichiometric amounts of an alkali metal hydroxide, or into a solution of a salt of an amino-carboxylic acid. The pH value of the reaction solution is generally in the alkaline range greater than 11.

2 mols of lactam or amino-carboxylic acid react with 1 mol of carbonyl sulfide, accompanied by formation of 1 mol of urea-N,N'-dicarboxylic acid salt and 1 mol of hydrogen sulfide. The majority of the hydrogen sulfide escapes from the reaction mixture, but some of it remains tied up in the alkaline reaction solution.

In order to allow the reaction to proceed to satisfactory yields, it is necessary to introduce the carbonyl sulfide in excess because carbonyl sulfide reaction undergoes regression toward the end of the reaction. The concentration of the lactam or amino-carboxylic acid reactant in the reaction solution is advantageously maintained at a high level, and, if water is used as the solvent medium, should be between 40 and 80% by weight.

An advantage of performing the reaction according to the present invention under these conditions is that only the desired urea-N,N'-dicarboxylic acid is formed without any undesirable side products. A further advantage is that the reaction period can be considerably shortened when a concentrated reaction solution is reacted with carbonyl sulfide. For this purpose an amount of water is added during the initial reaction stages such that the salt of the urea-N,N'-dicarboxylic acid formed by the reaction just barely remains in solution and no supersaturated solution can form.

Surprisingly, if caprolactam is used as the starting material, no auto-polymerization takes place, although the reaction conditions are similar to those under which nylon - 6, polycondensation occurs; only urea - N,N' - dicaproic acid is formed in the presence of carbonyl sulfide. The purity of the reaction products is very high; for instance, when caprolactam is used as the starting compound, urea-N,N'-dicaproic acid of more than 99.5% or sometimes even more than 99.8% purity is obtained. The yields are also very high; for example, if caprolactam or aminocaproic acid is used as starting material, the yield of urea-N,N'-dicaproic acid is in the neighborhood of 90% of theory.

The reaction solution is worked up and the urea-N,N'-dicarboxylic acid reaction product isolated by adding a dilute mineral acid, such as hydrochloric acid or sulfuric acid. Prior to addition of the mineral acid, the reaction solution is flushed with nitrogen or another inert gas or gas mixture until the gas emerging from the solution is free from carbonyl sulfide and hydrogen sulfide. The clear solution is then slowly admixed with moderately concentrated mineral acid. In order to obtain a virtually sulfur-free product, the pH of the reaction solution is decreased stepwise and the addition of acid is stopped at pH 6. Thereafter, the solution is heated at the boiling point until no more hydrogen sulfide can be detected, allowed to cool to 30–35° C., and the urea-N,N'-dicarboxylic acid reaction product is precipitated by further addition of mineral acid until the pH is 1 to 2.

The following examples further illustrate the present invention and will enable others skilled in the art to understand it more completely. It should be understood, however, that the instant invention is not limited solely to the particular examples given below.

The purity of the urea-N,N'-dicarboxylic acid end products in the following examples was investigated by determination of the acid number, the nitrogen content and the melting point.

EXAMPLE 1

262 parts by weight of ε-aminocaproic acid (2 mols) and 80 parts by weight of sodium hydroxide (2 mols) were dissolved in 1400 parts by weight of water, and the solution was boiled for ten hours while introducing 60 parts by weight per hour of gaseous carbonyl sulfide (2 mols per hour) into the boiling solution. The pH of the reaction solution was greater than 11. After completion of the carbonyl sulfide introduction the reaction solution was flushed with nitrogen. Thereafter, aqueous 15% hydrochloric acid was slowly added to the reaction solution until the pH was between 1 and 2. Subsequently, the resulting suspension was boiled until no more hydrogen sulfide could be detected, and was then allowed to cool, whereupon the precipitated product was filtered off, washed with water and dried in vacuo at 70° C. 254 parts by weight of urea-N,N'-dicaproic acid of the formula

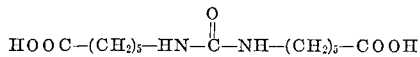

were obtained, which corresponds to a yield of 88.2% of theory based on the amount of ε-aminocaproic acid used.

|  | Percent N | Acid Number | Melting point, ° C. |
|---|---|---|---|
| Analysis: | | | |
| Calculated | 9.72 | 389.6 | |
| Found | 9.57 | 385.8 | 166 |

EXAMPLE 2

113 parts by weight of ε-caprolactam (1 mol) and 40 parts by weight of sodium hydroxide (1 mol) were dissolved in 61 parts by weight of water, and the solution was boiled for five hours while introducing 30 parts by weight per hour of carbonyl sulfide (0.5 mol per hour) into the boiling solution. In order to maintain the reaction solution below the solubility limit, i.e. below the saturation point, a total of 100 parts by weight of water were gradually added during the first 2¼ hours of the reaction time. After completion of the carbonyl sulfide introduction the reaction solution was flushed with nitrogen, and then the pH was adjusted to 6 with dilute hydrochloric acid. Thereafter, the solution was boiled until no more hydrogen sulfide could be detected, filtered in the presence of a little activated charcoal, the filtrate was diluted with water to twice its volume, and the dilute aqueous solution was acidified with aqueous 15% hydrochloric acid until precipitation of urea-N,N'-dicaproic acid was complete. Thereafter, the reaction mixture was again heated briefly to the boiling point, allowed to cool and then filtered. The filter cake was washed with cold water and dried in vacuo at 70° C., yielding 120 gm. of urea-N,N'-dicaproic acid, which corresponds to a yield of 83.3% of theory based on the amount of ε-caprolactam used.

|  | Percent N | Acid Number | Melting point, ° C. |
|---|---|---|---|
| Analysis: | | | |
| Calculated | 9.72 | 389.6 | |
| Found | 9.82 | 388.4 | 166.5–167.0 |

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. In the process of preparing a urea-N,N'-dicarboxylic acid, which comprises reacting an amino-carboxylic acid or a lactam thereof in the presence of a substantially equimolar amount of an alkaline compound, or a salt of said amino-carboxylic acid, dissolved in an inert solvent, with carbonyl sulfide accompanied by release of hydrogen sulfide at a temperature of 60 to 200° C. and at substantially atmospheric pressure, and isolating the reaction product from the reaction mixture, the improvement which consists of initiating said reaction in substantially concentrated aqueous solution at the boiling point thereof, and keeping the urea-N,N'-dicarboxylic acid salt formed in the solution below its solubility limit during the course of the reaction by addition of water or an aqueous organic solvent.

2. In the process of preparing a urea-N,N'-dicarboxylic acid, which comprises reacting an amino-carboxylic acid or a lactam thereof in the presence of a substantially equimolar amount of an alkaline compound, or a salt of said aminocarboxylic acid, dissolved in an inert solvent, with carbonyl sulfide accompanied by release of hydrogen sulfide at a temperature of 60 to 200° C. and at substantially atmospheric pressure, and isolating the reaction product from the reaction mixture, the improvement which consists of initiating said reaction in substantially concentrated aqueous solution at the boiling point thereof, keeping the urea-N,N'-dicarboxylic acid salt formed in the solution below its solubility limit during the course of the reaction by addition of water or an aqueous organic solvent, and, prior to isolation of the urea-N,N'-dicarboxylic acid reaction product, gradually reducing the pH of the reaction solution to 6 or less by addition of a mineral acid and expelling the residual carbonyl sulfide and hydrogen sulfide from the acidic solution.

3. The process of preparing an N,N'-(di(carboxylower alkyl)-urea, which comprises introducing carbonyl sulfide into a boiling, substantially saturated, alkaline aqueous solution of an ω-amino-lower alkanoic acid or a lactam thereof, lowering the pH of the alkaline reaction solution to between 1 and 6, purging the resulting acidic solution of carbonylsulfide and hydrogen sulfide, and isolating the N,N'-di(ω-carboxy-lower alkyl)-urea reaction product from said purged solution.

4. The process according to claim 3, wherein said ω-amino-lower alkanoic acid is ε-amino-caproic acid.

5. The process according to claim 3, wherein said lactam is ε-caprolactam.

References Cited

UNITED STATES PATENTS 2,877,268   3/1959   Applegath et al. _____ 260—518X

FOREIGN PATENTS 6406377   12/1964   Netherlands _____ 260—555S
1,073,464   6/1967   Great Britain _____ 260—555S LORRAINE A. WEINBERGER, Primary Examiner J. L. DAVISON, Assistant Examiner